(12) United States Patent
Wang et al.

(10) Patent No.: US 12,555,248 B2
(45) Date of Patent: Feb. 17, 2026

(54) VELOCITY MEASUREMENT METHOD, SYSTEM, DEVICE AND APPARATUS AND STORAGE MEDIUM, AS WELL AS VELOCITY FIELD MEASUREMENT METHOD AND SYSTEM

(71) Applicant: NINGBO INSTITUTE OF TECHNOLOGY, BEIHANG UNIVERSITY, Ningbo (CN)

(72) Inventors: Shaofei Wang, Ningbo (CN); Chong Pan, Ningbo (CN); Jinjun Wang, Ningbo (CN)

(73) Assignee: NINGBO INSTITUTE OF TECHNOLOGY, BEIHANG UNIVERSITY, Ningbo (CN)

( * ) Notice: Subject to any disclaimer, the term of this patent is extended or adjusted under 35 U.S.C. 154(b) by 38 days.

(21) Appl. No.: 18/013,596

(22) PCT Filed: Aug. 26, 2021

(86) PCT No.: PCT/CN2021/114701
§ 371 (c)(1),
(2) Date: Dec. 29, 2022

(87) PCT Pub. No.: WO2023/024007
PCT Pub. Date: Mar. 2, 2023

(65) Prior Publication Data
US 2024/0221184 A1 Jul. 4, 2024

(51) Int. Cl.
*G06T 7/246* (2017.01)
*G06T 7/73* (2017.01)

(52) U.S. Cl.
CPC .............. *G06T 7/248* (2017.01); *G06T 7/74* (2017.01); *G06T 2207/20084* (2013.01)

(58) Field of Classification Search
CPC .................. G06T 7/248; G06T 7/74; G06T 2207/20084
See application file for complete search history.

(56) References Cited

U.S. PATENT DOCUMENTS

| 5,532,814 | A  | * | 7/1996 | Cha ........................ | G01P 3/366 356/28 |
| 6,082,205 | A  | * | 7/2000 | Zborowski ............. | G01N 15/10 73/865.5 |
| 9,025,849 | B2 | * | 5/2015 | Fouras ................... | A61B 6/507 382/132 |
| 2019/0311482 | A1 | * | 10/2019 | Newby .................. | G06N 20/00 |

* cited by examiner

*Primary Examiner* — Pinalben Patel
(74) *Attorney, Agent, or Firm* — Tutunjian & Bitelto, P.C.

(57) ABSTRACT

A velocity measurement method, system, device and apparatus and storage medium, as well as a velocity field measurement method and system are provided. The velocity measurement method includes: inputting a single-particle image to a trained neural network model to obtain a predicted result image; a pixel position of a particle in the predicted result image is a predicted position of a particle in the single-particle image; the particle in the single-particle image is configured to characterize one particle in a two-dimensional (2D) flow field measurement region; the trained neural network model is trained by taking a previous frame of particle image in a particle image pair as an input and a subsequent frame of particle image as an output true value; and determining a predicted velocity at the pixel position of the particle in the single-particle image.

11 Claims, 6 Drawing Sheets

Input a single-particle image to a trained neural network model to obtain a predicted result image, where the single-particle image only includes one particle; the predicted result image only includes one particle; a pixel position of the particle in the predicted result image is a predicted position of the particle in the single-particle image; the particle in the single-particle image is configured to characterize one particle in a 2D flow field measurement region; the trained neural network model is a neural network model trained by taking a first frame of particle image in a particle image pair as an input and a second frame of particle image in the particle image pair as an output true value; the particle image pair is obtained by photographing the 2D flow field measurement region with a double-exposure camera; a tracer particle is mixed in the 2D flow field measurement region; and the first frame of particle image is a previous frame of image to the second frame of particle image — 11

Determine, according to a pixel position of the particle in the single-particle image and the pixel position of the particle in the predicted result image, a predicted velocity at the pixel position of the particle in the single-particle image — 12

FIG. 2

Determine, for multiple frames of single-particle images, a predicted velocity at a pixel position of a particle in each of the frames of single-particle images with the velocity measurement method, where pixel positions of particles in different single-particle images are different — 21

Determine a velocity field of the 2D flow field measurement region according to the predicted velocity at the pixel position — 22

FIG. 3

○ Real particle position
+ Predicted particle position

○ Real particle position
+ Predicted particle position

VELOCITY MEASUREMENT METHOD, SYSTEM, DEVICE AND APPARATUS AND STORAGE MEDIUM, AS WELL AS VELOCITY FIELD MEASUREMENT METHOD AND SYSTEM

TECHNICAL FIELD

The present disclosure relates to the field of velocity measurement, and in particular to a velocity measurement method, system, device, and apparatus and a storage medium storing the velocity measurement method, as well as a velocity field measurement method and system.

BACKGROUND

Particle image velocimetry (PIV) is a non-intrusive optical measurement technique in a flow velocity field. It measures velocities in the flow field by tracking double exposure displacements of particles on two frames of particle images captured by a laser-camera system. In order to match the particles on the first and second frames of images, a cross-correlation algorithm is used to calculate the similarity between particle distributions in certain windows on the frame sequences, specifically the cross-correlation algorithm is performed on a particle distribution in one window on the previous frame of image and particle distributions in all windows on a second frame of image, windows having maximum cross-correlation are selected, and a spatial distance between two windows is calculated to characterize velocity information of particles in the windows.

However, there is a problem for the above method, namely each window can only obtain one velocity vector to take as an average velocity for all particles in the window. Typically, the size of the window depends on the image resolution and double exposure time, and is 16×16 or 32×32, namely with 16 or 32 pixels, only one velocity vector can be calculated.

SUMMARY

Embodiments of the present disclosure provide a pixel-level velocity measurement method, system, device and apparatus and a storage medium storing the velocity measurement method, as well as a pixel-level velocity field measurement method and system.

To achieve the above objective, the present disclosure provides the following technical solutions:

According to a first aspect, the present disclosure provides a velocity measurement method, including:
inputting a single-particle image to a trained neural network model to obtain a predicted result image, where the single-particle image only includes one particle; the predicted result image only includes one particle; a pixel position of the particle in the predicted result image is a predicted position of the particle in the single-particle image; the particle in the single-particle image is configured to characterize one particle in a two-dimensional (2D) flow field measurement region; the trained neural network model is a neural network model trained by taking a first frame of particle image in a particle image pair as an input and a second frame of particle image in the particle image pair as an output true value; the particle image pair is obtained by photographing the 2D flow field measurement region with a double-exposure camera; a tracer particle is mixed in the 2D flow field measurement region; and the first frame of particle image is a previous frame of image to the second frame of particle image; and
determining, according to a pixel position of the particle in the single-particle image and the pixel position of the particle in the predicted result image, a predicted velocity at the pixel position of the particle in the single-particle image.

According to a second aspect, the present disclosure provides a velocity field measurement method, including:
determining, for multiple frames of single-particle images, a predicted velocity at a pixel position of a particle in each of the frames of single-particle images with the velocity measurement method provided in the first aspect, where pixel positions of particles in different single-particle images are different; and
determining a velocity field of the 2D flow field measurement region according to the predicted velocity at the pixel position.

According to a third aspect, the present disclosure provides a velocity measurement system, including:
a particle position prediction module configured to input a single-particle image to a trained neural network model to obtain a predicted result image, where the single-particle image only includes one particle; the predicted result image only includes one particle; a pixel position of the particle in the predicted result image is a predicted position of the particle in the single-particle image; the particle in the single-particle image is configured to characterize one particle in a 2D flow field measurement region; the trained neural network model is a neural network model trained by taking a first frame of particle image in a particle image pair as an input and a second frame of particle image in the particle image pair as an output true value; the particle image pair is obtained by photographing the 2D flow field measurement region with a double-exposure camera; a tracer particle is mixed in the 2D flow field measurement region; and the first frame of particle image is a previous frame of image to the second frame of particle image; and
a pixel point velocity prediction module configured to determine, according to a pixel position of the particle in the single-particle image and the pixel position of the particle in the predicted result image, a predicted velocity at the pixel position of the particle in the single-particle image.

According to a fourth aspect, the present disclosure provides a velocity field measurement system, including:
the velocity measurement system provided by the fourth aspect of the present disclosure, configured to predict a velocity at a pixel position of a particle in each of multiple frames of single-particle images, where pixel positions of particles in different single-particle images are different; and
a velocity field determination module configured to determine a velocity field of the 2D flow field measurement region according to the predicted velocity at the pixel position.

According to a fifth aspect, the present disclosure provides a velocity measurement device, at least including a processor and a memory, where the processor executes the velocity measurement method in the first aspect of the present disclosure by executing a program stored in the memory.

According to a sixth aspect, the present disclosure provides a storage medium, which stores multiple instructions, where the instructions are suitable for being loaded by a processor, to execute the steps of the velocity measurement method in the first aspect of the present disclosure.

According to a seventh aspect, the present disclosure provides a velocity measurement apparatus, including a laser emitter, a lens component, a double-exposure camera, a high-pass filter and the velocity measurement device in the fifth aspect of the present disclosure, where the laser emitter is configured to emit laser; the laser emitted from the laser emitter is formed into a light plane through the lens component; and the 2D flow field measurement region includes a region obtained by intersecting the light plane and the flow field measurement region; and the double-exposure camera is configured to perform double-exposure photographing on the 2D flow field measurement region; the tracer particle is mixed in the flow field measurement region; and the high-pass filter is provided in front of a lens of the double-exposure camera.

The following technical effects are achieved according to the specific embodiments of the present disclosure: A neural network model is used to learn previous and subsequent frames of particle images in a 2D flow field measurement region, namely the neural network model is trained by taking the previous frame of particle image as an input and the subsequent frame of particle image as an output true value. The trained neural network model implicitly includes time-averaged information of a flow field in the 2D flow field measurement region. Then, a single-particle image (it includes one particle only at a pixel point) is input to the trained neural network model to obtain a predicted result image corresponding to the single-particle image, which explicitly expresses the information of the flow field implicitly included in the neural network model. At last, a velocity at a pixel point of the particle in the single-particle image is calculated according to the pixel position of the particle in the single-particle image and a pixel position of a particle in the corresponding predicted result image, thereby realizing pixel-level velocity measurement.

By traversing each single-particle image in the whole 2D flow field measurement region based on the position of the particle, a pixel-level velocity of each particle in the 2D flow field measurement region can be predicted, and thus a pixel-level velocity field distribution of the 2D flow field measurement region can be predicted.

BRIEF DESCRIPTION OF THE DRAWINGS

To describe the embodiments of the present disclosure or the technical solutions in the prior art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

FIG. 2 is a schematic flowchart of a velocity measurement method according to an embodiment of the present disclosure;

FIG. 3 is a schematic flowchart of a velocity field measurement method according to an embodiment of the present disclosure;

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a pixel-level velocity measurement method, system, device and apparatus and a storage medium storing the velocity measurement method, as well as a pixel-level velocity field measurement method and system.

In embodiments of the present disclosure, the velocity measurement method is implemented based on a following core concept: A neural network is used to learn a movement trajectory of a particle in a 2D flow field measurement region. A single-particle image only having a particle at a pixel point is input to the neural network to obtain a predicted position for the particle in the single-particle image, such that the trajectory of the particle learned by the neural network is explicitly expressed. At last, a velocity at a pixel point of the particle in the single-particle image is obtained based on the position and predicted position of the particle in the single-particle image, thereby realizing pixel-level velocity measurement.

The velocity at any pixel point can be obtained in the above method to realize measurement on a velocity field.

The neural network learns the movement trajectory of the particle in the 2D flow field measurement region based on photographed images having a certain time difference to the 2D flow field measurement region. Specifically, a double-exposure camera may be used to perform double-exposure photographing on the 2D flow field measurement region to obtain previous and subsequent frames of images having a certain time difference to the 2D flow field measurement region. By taking the previous frame of image as an input of the neural network, and the subsequent frame of image as an output true value of the neural network, the neural network is trained to obtain a neural network model implicitly including movement information of particles in the 2D flow field measurement region.

Exemplarily, the velocity measurement method is applied to measurement scenarios on flow velocities in a wake over the bluff body. For example, after the bullet is fired, the movement of the bullet have a certain impact on surrounding fluids. By analyzing a velocity field of the surrounding fluids of the bullet, improvements can be made to a surface structure and the like of the bullet, so as to yield better performance of the bullet, such as a longer firing range and a higher accuracy without shifting. The above experiment is typically conducted in wind tunnels or water tunnels.

Figure 1:
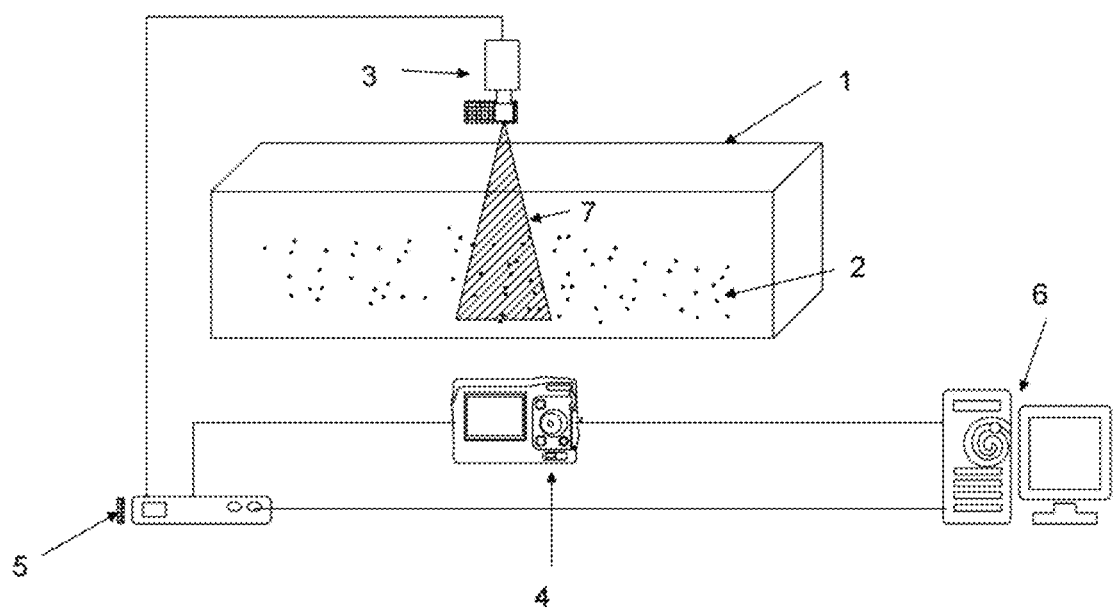
FIG. 1 is a schematic view of velocity measurement hardware according to an embodiment of the present disclosure.

Referring to FIG. 1, fluorescent particles 2 (tracer particles) are uniformly mixed in a multifunctional water tunnel 1 (or wind tunnel). An Nd-YAG double-cavity laser 3 and a lens component are used to emit double-pulse laser to illuminate a 2D flow field measurement region 7. A double-exposure charge coupled device (CCD) camera 4 (double-exposure camera) is used to perform double-exposure photographing on the 2D flow field measurement region 7 illuminated by the double-pulse laser (the fluorescent particles are mixed in the 2D flow field measurement region).

Synchronous work of the double-exposure CCD camera 4 and the Nd-YAG double-cavity laser 3 is controlled by a special synchronizer 5, and transmitted to a computer 6 through a high-speed Cameralink cable for storage. The water tunnel generates a uniform and stable water flow. The fluorescent particles are uniformly dispersed in water at an upstream of the 2D flow field measurement region. The Nd-YAG double-cavity laser 3 is configured to generate two laser pulses, of which the double-exposure time is as required and the wavelength is 532 nm. Through the assorted extender lens component, it generates sheet laser having a thickness within 1 mm. The direction of the laser is parallel to an observation wall in front of the water tunnel, so as to illuminate the 2D flow field measurement region 7 to be observed. In front of a lens of the double-exposure CCD camera 4, a high-pass filter is provided to cut off illumination laser at 532 nm. Thus, information of fluorescent light excited from the fluorescent particles and having a greater wavelength is recorded by a chip of the double-exposure CCD camera 4. The central control computer, the laser and the camera are connected by the special synchronizer, which ensures that previous and subsequent frames of images of the double-exposure CCD camera 4 are respectively illuminated by double pulses of the laser. Images acquired by the double-exposure CCD camera 4 are transmitted to the central control computer through the cable.

The previous and subsequent frames of images photographed by the double-exposure CCD camera 4 are respectively taken an input and an output true value of the neural network to train the neural network.

Before the neural network is trained, the images photographed by the double-exposure CCD camera 4 are subjected to preprocessing, specifically including image calibration, correction for lens distortion, background removal, etc. The preprocessing can ensure clear and accurate particle images, upon which the neural network is used for learning.

In the image calibration, a chessboard target is used to extract feature points, correct distortion coefficients, and calculate spatial resolutions in the images. Due to background noises in a photographing environment, there are problems, for example, partial background spots are too bright. These problems are all eliminated by side line feature extraction.

In an example, referring to FIG. 2, the velocity measurement method includes the following steps:

Step 11: Input a single-particle image to a trained neural network model to obtain a predicted result image, where the single-particle image only includes one particle; the predicted result image only includes one particle; a pixel position of the particle in the predicted result image is a predicted position of the particle in the single-particle image; the particle in the single-particle image is configured to characterize one particle in a 2D flow field measurement region; the trained neural network model is a neural network model trained by taking a first frame of particle image in a particle image pair as an input and a second frame of particle image in the particle image pair as an output true value; the particle image pair is obtained by photographing the 2D flow field measurement region with a double-exposure camera; a tracer particle is mixed in the 2D flow field measurement region; and the first frame of particle image is a previous frame of image to the second frame of particle image.

Step 12: Determine, according to a pixel position of the particle in the single-particle image and the pixel position of the particle in the predicted result image, a predicted velocity at the pixel position of the particle in the single-particle image.

Before Step 11, the velocity measurement method may further include: a step for training the neural network model and a step for generating the single-particle image.

The step for training the neural network is to train the neural network model by taking the first frame of particle image in the particle image pair as the input and the second frame of particle image in the particle image pair as the output true value, where the particle image pair is obtained by photographing the 2D flow field measurement region with the double-exposure camera; the tracer particle is mixed in the 2D flow field measurement region; and the first frame of particle image is the previous frame of image to the second frame of particle image.

The step for generating the single-particle image is to generate a single particle at a pixel point of an image with a virtual particle generator, thereby obtaining the single-particle image.

In an example, referring to FIG. 3, the velocity field measurement method includes the following steps:

Determine, for multiple frames of single-particle images, a predicted velocity at a pixel position of a particle in each of the frames of single-particle images with the velocity measurement method in the above example, where pixel positions of particles in different single-particle images are different.

Determine a velocity field of the 2D flow field measurement region according to the predicted velocity at the pixel position.

The velocity measurement method and the velocity field measurement method can be mainly divided into two parts, namely construction of the neural network, and prediction and tracing of the single particle.

The first part refers to the construction and training of the neural network. The deep convolutional neural network (DCNN) is constructed to learn a trajectory of the particle. The architecture of the neural network is illustrated in FIG. 3.

The first frame of particle image (which is a grayscale image specifically) is taken as the input, and there is one channel. Feature extraction is performed through multiple convolutional layers to output a series of feature layers having different spatial resolutions and numbers of channels. Deconvolution is performed to gradually increase a resolution of a feature map. By setting an appropriate parameter of a deconvolution kernel, an output from the deconvolution on each layer has a same spatial scale as an output from the previous convolutional layer. The two outputs are subjected to splicing and convolution to predict a particle distribution at the present scale. Deconvolution and splicing are performed continuously, until a predicted output has a same spatial scale with the input particle image. The neural network is trained with multiple acquired particle image pairs. Specifically, the neural network is trained by taking a previous frame of particle image as an input and a subsequent frame of particle image as an output true value, and selecting an appropriate loss function and an appropriate training strategy, until a predicted particle image is completely consistent with the subsequent frame of particle image (real particle image). In this case, the neural network implicitly includes time-averaged information of a flow field.

The implicit information of the flow field is explicitly expressed from the neural network. In order to obtain the high-spatial-resolution flow field from the trained neural network, there is a need to obtain flow information at each pixel point in the image. A series of particle images (referred to as single-particle images), each only including a single particle, are generated through the virtual particle generator. Positions of particles in these particle images traverse pixel points in the whole image. The particle images are input to the neural network one by one. An output predicted result image also only includes a single particle, which corresponds to a spatial position after the single particle in the input single-particle image moves. Therefore, a trajectory chart of the particle is obtained. Central positions of particles on the two frames of images are acquired through Gaussian fitting. By dividing double-exposure time from a displacement, a velocity of movement of each particle is obtained, and taken as velocity information at a pixel point of the particle. Therefore, the pixel-level velocity measurement is realized. The above operations are performed on particles at all pixel points to obtain the high-resolution flow field information.

The construction and training of the neural network are described below in detail.

Figure 4:
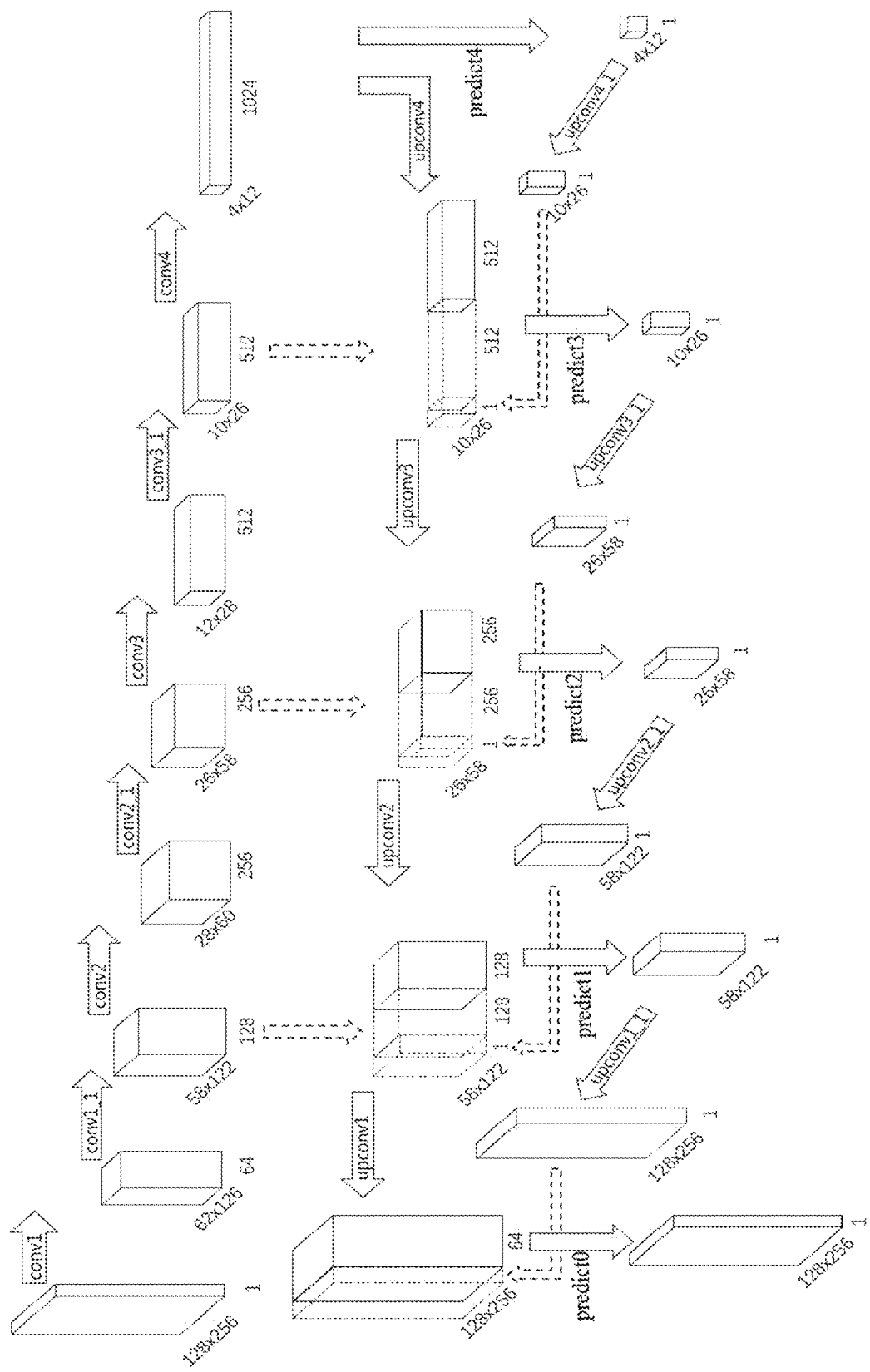
FIG. 4 is a schematic structural view of a neural network model according to an embodiment of the present disclosure.

1) Referring to FIG. 4, construction of convolutional layers and deconvolutional layers: A series of convolutional layers are constructed. In each layer, a certain number of convolution kernels are used to perform convolution on the input, thereby outputting information of a new feature map. A number of channels is equivalent to the number of convolution kernels. The convolution is mathematically expressed by Eq. (1):

$$Conv_{x,y} = \sum_{i}^{p*q} w_i v_i \quad (1)$$

where, v is input information, w is a weight of a convolution kernel, and the convolution kernel has a size of p×q.

The neural network includes nine convolutional layers. The size of the convolution kernel is sequentially reduced from 9×9 to 2×2. Upon the convolution of each layer, a nonlinear activation function that is a rectified linear unit (ReLU) activation function is added, so as to enhance a nonlinear fitting capability of the model. The activation function is mathematically expressed by Eq. (2):

$$f(x) = \max(0, x) \quad (2)$$

At last, a 3×11×1024 feature layer is obtained. Thereafter, the deconvolution is performed to expand the input spatially. The deconvolution has a same mathematical operation as the convolution, but the difference lies in: The input feature map is filled and extended by 0 as a size to be output, and then the size is multiplied by a convolution kernel. An output from the deconvolution and an output from the previous convolutional layer having a same size as the output from the deconvolution are spliced, and a single-channel output is predicted with a convolutional layer. The output from the previous convolutional layer and the output from the deconvolutional layer have a same spatial size. The deconvolution and splicing are sequentially performed for four times to gradually increase the size of the predicted single-channel output and obtain the single-channel output same as the input of the neural network. The single-channel output is taken as the whole output of the neural network.

2) Calculation of the loss function: The loss of the neural network is calculated with a mean-square error (MSE). Since the neural network can have multiple outputs of different resolutions, losses for the outputs of different resolutions are weighted. The loss of the neural network is calculated by Eq. (3):

$$\text{Loss}(y, y') = \frac{1}{n}\sum_{i=1}^{n}\left(\lambda_0(y_0 - y'_0)^2 + \lambda_1(y_1 - y'_1)^2 + \lambda_2(y_2 - y'_2)^2\right) \quad (3)$$

where, y is an output true value of the neural network, namely y is a 2D matrix and a real second frame of particle grayscale image, y' is an output of the neural network and is also a 2D matrix, subscripts 0-2 represent a true value and a predicted value at different resolutions, $\lambda$ is a weight for calculating the loss at each resolution, and n is a number of batches in the training.

3) Construction of a training set and a validation set: Particle image pairs acquired by an experiment are subjected to preprocessing, including image rotation, mirroring, noise superimposition, and image compression, and then proportionally divided into a training set and a validation set. The training set accounts for 80%, while the validation set accounts for 20%. In each group of samples, there are the first frame of particle image having the original size that serves as the input of the neural network, and the second frame of particle image having a different resolution that serves as the corresponding output true value of the neural network.

4) Fitting and training of the neural network: For samples in the training set, every eight samples are formed into one group to take as one batch to train the weight of the neural network. An Adam optimization learning algorithm is selected for optimized training. The optimized training is as follows:

4-1 Initialization is performed, such that a weight in the neural network is $\theta_0$, a first-order moment is $m_0$, a second-order moment is $v_0$, a learning rate $\alpha=0.00001$, and parameter weights $\beta_1=0.9$, $\beta_2=0.999$, and $\varepsilon=10^{-8}$.

4-2 Under the present weight, the output loss $\text{Loss}_t(\theta_{t-1})$ of the neural network is calculated with samples in one batch, and a gradient on the weight $\theta$ is sought:

$$g_t = \nabla_\theta \text{Loss}_t(\theta_{t-1}) \quad (4)$$

where t represents a number of present iterations, and t−1 is a number of previous iterations.

4-3 A biased first-order moment and a biased second-order moment are calculated:

$$m_t = \beta_1 \cdot m_{t-1} + (1-\beta_1)g_t \quad (5)$$

$$v_t = \beta_2 \cdot v_{t-1} + (1-\beta_2)g_t^2 \quad (6)$$

4-4 An unbiased first-order moment and an unbiased second-order moment are calculated:

$$\hat{m}_t = m_t/(1-\beta_1^t) \quad (7)$$

$$\hat{v}_t = v_t/(1-\beta_2^t) \quad (8)$$

4-5 The weight of the neural network is calculated and updated:

$$\theta_t = \theta_{t-1} - \alpha \cdot \hat{m}_t/\left(\sqrt{\hat{v}_t + \varepsilon}\right) \quad (9)$$

4-6 Operations 4-2 to 4-5 are repeated, until the loss is no longer reduced, thereby completing the training.

4-7 The validation set is used to validate the accuracy of prediction of the neural network. A first frame in the validation set is taken as an input to predict the second frame of particle image which is compared with the corresponding real particle image. It is considered that the training accuracy is as required when positions of the particles coincide with each other.

In this case, the DCNN implicitly including all information of the flow field in the 2D flow field measurement region is obtained.

The prediction and tracking of the single particle are described below in detail:

The trained neural network can accurately predict the movement trajectory of the particle. However, if the conventional multi-particle image is input for prediction, particles on the previous and subsequent frames of images still cannot be matched accurately for calculation. Therefore, there is a need to generate a series of virtual single-particle images that are input to the neural network, and the neural network only needs to predict position information of the single particle. Central positions of particles on the input and output can be extracted with simple Gaussian fitting to calculate a velocity field, specifically:

1) Through the virtual particle generator, a single particle is generated at any pixel point on the image. The particle has a morphology satisfying a Gaussian distribution, a constant particle diameter, and a size basically consistent with the real particle in the experiment.

2) The single-particle image is input to the trained neural network model, and input and output particle images are checked. The movement of the particle can be observed by naked eyes.

3) Center coordinates of particles on the two particle images are extracted through the Gaussian fitting based on a following principle:

It is assumed that a gray value of the particle satisfies a Gaussian function:

$$f(x, y) = A\exp\left(-\frac{(x-x_0)^2}{2\sigma_x^2} - \frac{(y-y_0)^2}{2\sigma_y^2}\right) \quad (10)$$

where, $(x_0, y_0)$ is a center coordinate of the particle, and $(\sigma_x, \sigma_x)$ is a deviation in x and y directions. Seeking logarithms at two sides can derive:

$$\ln f(x, y) = \ln A - \frac{(x-x_0)^2}{2\sigma_x^2} - \frac{(y-y_0)^2}{2\sigma_y^2} \quad (11)$$

Further transformation leads to:

$$\ln f(x, y) = ax^2 + by^2 + cx + dy + e \quad (12)$$

Where:

$$a = -\frac{1}{2\sigma_x^2}$$

$$b = -\frac{1}{2\sigma_y^2}$$

$$c = -\frac{1}{2\sigma_z^2}$$

$$d = -\frac{y_0}{\sigma_y^2}$$

$$e = \ln A - \frac{x_0^2}{2\sigma_x^2} - \frac{y_0^2}{2\sigma_y^2}$$

Different point coordinates and gray values are substituted into the above equations to obtain the center coordinates $(x_0, y_0)$ of the particles. Through the center coordinates of the particles on the previous and subsequent frames of images, the coordinate difference can be calculated. By substituting the known spatial resolution of the image and double-exposure time into the equations, velocity information can be calculated. Herein, the velocity information serves as information of a flow field at a spatial position of the particle.

4) Step 1) is repeated. All pixel points on the image are traversed by the position of the particle. Steps 2) to 3) are repeated for each image, thereby obtaining high-resolution velocity information in the flow field.

The effect of the velocity measurement method is validated below with reference to a specific application scenario:

Measurement on a flow field of a boundary layer is taken as a research object. There is an included angle of 15° between the boundary layer and the flow incoming direction. A 2D particle image in a near wall region is captured with laser and a camera. The laser is used to form a 2D light sheet to illuminate a measured region (namely the 2D flow field measurement region) in the water tunnel. A tracer particle is added to the water tunnel. After irradiated by the laser, the tracer particle is formed into a scattered spot, and recorded by the camera. In order to make the camera and the laser work synchronously, a synchronizer is used to trigger the laser and the camera to emit light and capture the image at the same time. The image is recorded to the computer for subsequent processing and analysis. The tested image includes 64×128 pixels, and about 15-60 particles. The maximum displacement of the particle is about 12 pixels. 400 image pairs are selected as the training set, and 100 image pairs are selected as the validation set.

Figure 5A:
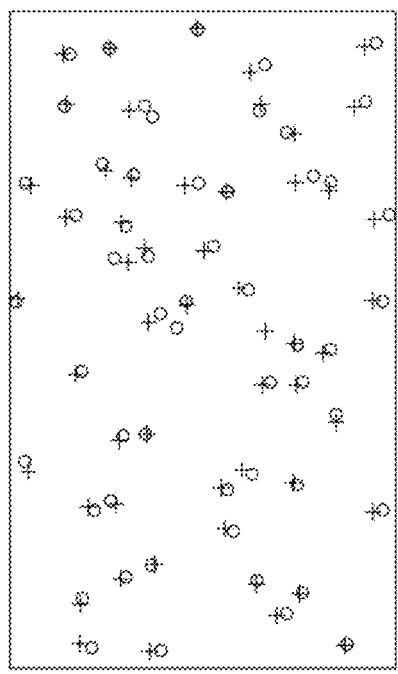
FIG. 5A illustrates a comparison between predicted particles and real particles on a same image before completion of training according to an embodiment of the present disclosure.
Figure 5B:
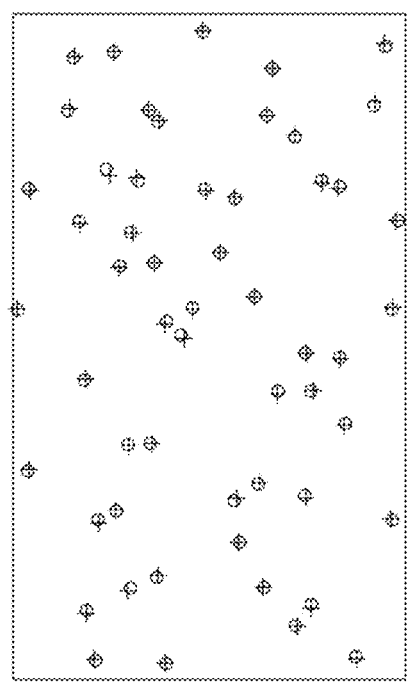
FIG. 5B illustrates a comparison between predicted particles and real particles on a same image after completion of training according to an embodiment of the present disclosure.

FIGS. 5A-B illustrate an accuracy of prediction of the neural network model before and after completion of training. FIG. 5A illustrates predicted particles before completion of training and a comparison between the predicted particles and real particles on a same image, where the predicted particles are labeled in green, the real particles are labeled in red, and an obvious deviation between the predicted particles and the real particles in some regions indicates that the neural network has a low accuracy of prediction. FIG. 5B illustrates predicted particles after completion of training and a comparison with real particles. In the figure, only yellow particles exist, which indicates that the predicted particles coincide with the real particles completely.

Figure 6A:
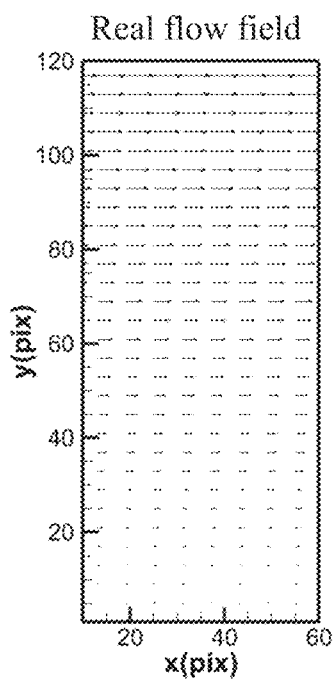
FIG. 6A illustrates a real flow field.
Figure 6B:
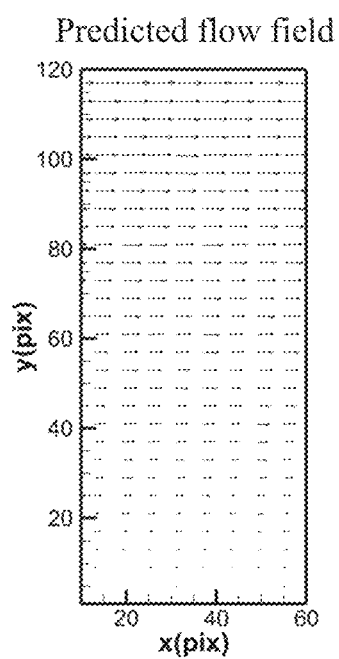
FIG. 6B illustrates a flow field obtained by measuring with a velocity measurement method according to an embodiment of the present disclosure.

FIGS. 6A-B illustrate comparison between a high-resolution velocity field and a real flow velocity. Through the comparison on flow velocities, it is found that the method can obtain flow information completely consistent with the real flow field, and the resolution is the same as the particle image. Therefore, the method is feasible to obtain the high-resolution accurate flow field.

Figure 7:
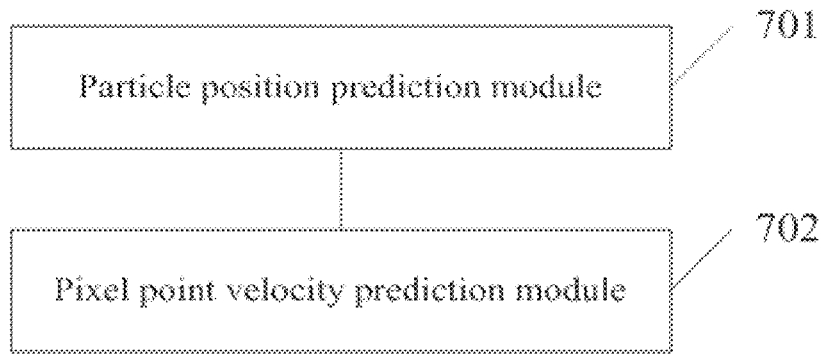
FIG. 7 is a schematic structural view of a velocity measurement system according to an embodiment of the present disclosure.

In an example, referring to FIG. 7, the velocity measurement system provided by the present disclosure and corresponding to the velocity measurement method includes: a particle position prediction module 701 and a pixel point velocity prediction module 702.

The particle position prediction module 701 is configured to input a single-particle image to a trained neural network model to obtain a predicted result image. The single-particle image only includes one particle. The predicted result image only includes one particle. A pixel position of the particle in the predicted result image is a predicted position of the particle in the single-particle image. The particle in the single-particle image is configured to characterize one particle in a 2D flow field measurement region. The trained neural network model is a neural network model trained by taking a first frame of particle image in a particle image pair as an input and a second frame of particle image in the particle image pair as an output true value. The particle image pair is obtained by photographing the 2D flow field measurement region with a double-exposure camera. A tracer particle is mixed in the 2D flow field measurement region. The first frame of particle image is a previous frame of image to the second frame of particle image.

The pixel point velocity prediction module 702 is configured to determine, according to a pixel position of the particle in the single-particle image and the pixel position of the particle in the predicted result image, a predicted velocity at the pixel position of the particle in the single-particle image.

Figure 8:
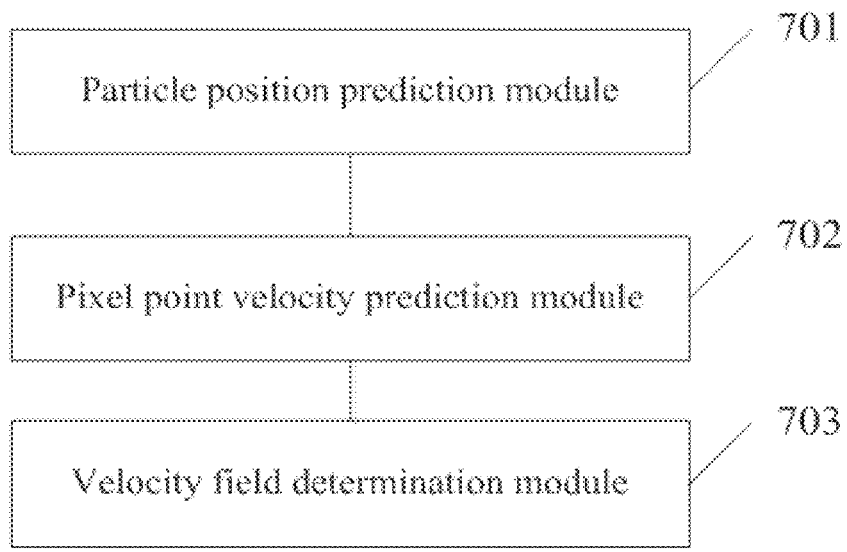
FIG. 8 is a schematic structural view of a velocity field measurement system according to an embodiment of the present disclosure.

In an example, referring to FIG. 8, the velocity field measurement system provided by the present disclosure and corresponding to the velocity field measurement method includes: the velocity measurement system and a velocity field determination module 703.

The velocity measurement system is configured to predict a velocity at a pixel position of a particle in each of multiple frames of single-particle images. Pixel positions of particles in different single-particle images are different.

The velocity field determination module 703 is configured to determine a velocity field of the 2D flow field measurement region according to the predicted velocity at the pixel position.

In an example, the velocity measurement device provided by the present disclosure at least includes a processor and a memory. The processor executes the velocity measurement method by executing a program stored in the memory.

Figure 9:
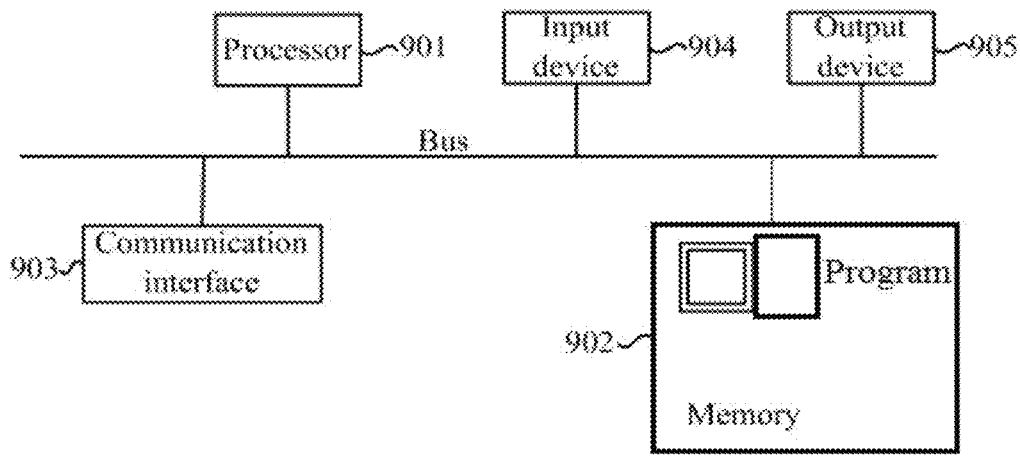
FIG. 9 is a structural schematic view of possible hardware of a velocity measurement device according to an embodiment of the present disclosure.

FIG. 9 is a structural schematic view of possible hardware of the velocity measurement device, including: a bus, a processor 901, a memory 902, a communication interface 903, an input device 904 and an output device 905. The processor 901, the memory 902, the communication interface 903, the input device 904 and the output device 905 are connected to each other through the bus.

The bus may include a channel for transmitting information between components of a computer system.

The processor 901 may be a universal processor, such as a universal central processing unit (CPU), a network processor (NP), and a microprocessor, and may also be an application-specific integrated circuit (ASIC), or one or more integrated circuits for controlling program execution in a solution of the present disclosure. The processor may also be a digital signal processor (DSP), a field programmable gate array (FPGA) or other programmable logic device, a discrete gate or a transistor logic device, or a discrete hardware component.

The memory 902 stores a program or a script executing the technical solution of the present disclosure, and may further store an operation system and other key businesses. Specifically, the program may include a program code. The program code includes a computer operation instruction. The script is generally stored in a text (such as an American standard code for information interchange (ASCII)), and is explained or compiled only when called.

The input device 904 may include an apparatus for receiving data and information input by a user, such as a keyboard, a mouse, a camera, a voice input apparatus, and a touch screen.

The output device 905 may include an apparatus allowed to output information to the user, such as a display screen and a loudspeaker.

The communication interface 903 may include an apparatus using any transceiver to communicate with other devices or communication networks, such as an Ethernet, a radio access network (RAN), and a wireless local area network (WLAN).

The processor 901 can implement the velocity measurement method by executing the program in the memory 902 and calling other devices.

In addition, functions of the units of the velocity measurement device shown in FIG. 9 can be implemented by enabling the processor 901 to execute the program in the memory 902 and call other devices.

In an example, the storage medium provided by the present disclosure stores multiple instructions. The instructions are suitable for being loaded by a processor to execute the steps in the velocity measurement method.

In an example, the velocity measurement apparatus provided by the present disclosure includes a laser emitter, a lens component, a double-exposure camera, a high-pass filter, and the velocity measurement device.

The laser emitter is configured to emit laser. The laser emitted from the laser emitter is formed into a light plane through the lens component. The 2D flow field measurement region includes a region obtained by intersecting the light plane and the flow field measurement region.

The double-exposure camera is configured to perform double-exposure photographing on the 2D flow field measurement region. The tracer particle is mixed in the flow field measurement region. The high-pass filter is provided in front of a lens of the double-exposure camera.

Each embodiment of the present specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A velocity measurement method, comprising:
    inputting a single-particle image to a trained neural network model to obtain a predicted result image, wherein the single-particle image only comprises one particle; the predicted result image only comprises one particle; a pixel position of the particle in the predicted result image is a predicted position of the particle in the single-particle image; the particle in the single-particle image is configured to characterize one particle in a two-dimensional (2D) flow field measurement region; the trained neural network model is a neural network model trained by taking a first frame of particle image in a particle image pair as an input and a second frame of particle image in the particle image pair as an output true value; the particle image pair is obtained by photographing the 2D flow field measurement region with a double-exposure camera; a tracer particle is mixed in the 2D flow field measurement region; and the first frame of particle image is a previous frame of image to the second frame of particle image;
    determining, according to a pixel position of the particle in the single-particle image and the pixel position of the particle in the predicted result image, a predicted velocity at the pixel position of the particle in the single-particle image;
    wherein extracting a center coordinate of the particle in the single-particle image and a center coordinate of the particle in the predicted result image; and
    calculating the predicted velocity at the pixel position of particle in the single-particle image according a coordinate difference, a spatial resolution of the single-particle image and double exposure time of the double-exposure camera, wherein the coordinate difference is a difference between the center coordinate of the particle in the single-particle image and the center coordinate of the particle in the predicted result image.

2. The velocity measurement method according to claim 1, before the inputting a single-particle image to a trained neural network model, further comprising:
    generating a single particle at a pixel point of an image with a virtual particle generator, thereby obtaining the single-particle image.

3. A velocity field measurement method, comprising:
    determining, for multiple frames of single-particle images, a predicted velocity at a pixel position of a particle in each of the frames of single-particle images with the velocity measurement method according to claim 1, wherein pixel positions of particles in different single-particle images are different; and
    determining a velocity field of the 2D flow field measurement region according to the predicted velocity at the pixel position.

4. The velocity field measurement method according to claim 2, before the inputting a single-particle image to a trained neural network model, further comprising:
    generating a single particle at a pixel point of an image with a virtual particle generator, thereby obtaining the single-particle image.

5. A velocity measurement device, at least comprising a processor and a memory, wherein the processor executes the velocity measurement method according to claim 1 by executing a program stored in the memory.

6. A velocity measurement apparatus, comprising a laser emitter, a lens component, a double-exposure camera, a high-pass filter, and the velocity measurement device according to claim 5, wherein
    the laser emitter is configured to emit laser; the laser emitted from the laser emitter is formed into a light plane through the lens component; and the two-dimensional (2D) flow field measurement region comprises a region obtained by intersecting the light plane and the flow field measurement region; and
    the double-exposure camera is configured to perform double-exposure photographing on the 2D flow field measurement region; the tracer particle is mixed in the flow field measurement region; and the high-pass filter is provided in front of a lens of the double-exposure camera.

7. The velocity measurement device according to claim 5, before the inputting a single-particle image to a trained neural network model, further comprising:
    generating a single particle at a pixel point of an image with a virtual particle generator, thereby obtaining the single-particle image.

8. A storage medium, which stores multiple instructions, wherein the instructions are suitable for being loaded by a processor, to execute the steps of the velocity measurement method according to claim 1.

9. The storage medium according to claim 8, before the inputting a single-particle image to a trained neural network model, further comprising:
    generating a single particle at a pixel point of an image with a virtual particle generator, thereby obtaining the single-particle image.

10. A velocity measurement system, comprising:
    a particle position prediction module configured to input a single-particle image to a trained neural network model to obtain a predicted result image, wherein the single-particle image only comprises one particle; the predicted result image only comprises one particle; a pixel position of the particle in the predicted result image is a predicted position of the particle in the single-particle image; the particle in the single-particle image is configured to characterize one particle in a two-dimensional (2D) flow field measurement region; the trained neural network model is a neural network model trained by taking a first frame of particle image in a particle image pair as an input and a second frame of particle image in the particle image pair as an output true value; the particle image pair is obtained by photographing the 2D flow field measurement region with a double-exposure camera; a tracer particle is mixed in the 2D flow field measurement region; and the first frame of particle image is a previous frame of image to the second frame of particle image;

a pixel point velocity prediction module configured to determine, according to a pixel position of the particle in the single-particle image and the pixel position of the particle in the predicted result image, a predicted velocity at the pixel position of the particle in the single-particle image;

wherein extracting a center coordinate of the particle in the single-particle image and a center coordinate of the particle in the predicted result images; and calculating the predicted velocity at the pixel position of the particle in the single-particle image according a coordinate difference, a spatial resolution single-particle image and double-exposure time of the double-exposure camera, wherein the coordinate difference is a difference between the center coordinate of the particle in the single-difference image and the center coordinate of the particle in the predicted result image.

11. A velocity field measurement system, comprising:

the velocity measurement system according to claim 10, configured to predict a velocity at a pixel position of a particle in each of multiple frames of single-particle images, wherein pixel positions of particles in different single-particle images are different; and a velocity field determination module configured to determine a velocity field of the two-dimensional (2D) flow field measurement region according to the predicted velocity at the pixel position.

* * * * *